United States Patent  
Gaspar et al.

(10) Patent No.: US 11,902,833 B2
(45) Date of Patent: Feb. 13, 2024

(54) RATE ADJUSTMENT ANTICIPATING CHANGE IN CHANNEL CAPACITY

(71) Applicant: Microsoft Technology Licensing, LLC, Redmond, WA (US)

(72) Inventors: Ivan Simoes Gaspar, West Linn, OR (US); Benjamin Eliot Lundell, Seattle, WA (US); Emily Po-Kay Chung, Mountain View, CA (US); Syed Toaha Ahmad, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/703,800

(22) Filed: Mar. 24, 2022

(65) Prior Publication Data

US 2023/0308950 A1  Sep. 28, 2023

(51) Int. Cl.
*H04W 28/20* (2009.01)
*H04W 28/08* (2023.01)
*H04W 28/22* (2009.01)

(52) U.S. Cl.
CPC ....... *H04W 28/0942* (2020.05); *H04W 28/20* (2013.01); *H04W 28/22* (2013.01)

(58) Field of Classification Search
CPC . H04W 28/0942; H04W 28/20; H04W 28/22; H04W 72/121; H04W 72/566
See application file for complete search history.

(56) References Cited

U.S. PATENT DOCUMENTS

| 2016/0150549 | A1 | 5/2016 | Kim et al. |
| 2019/0068473 | A1 | 2/2019 | Vu |
| 2019/0208510 | A1* | 7/2019 | Park ........................ H04L 5/006 |
| 2020/0259575 | A1 | 8/2020 | Bai et al. |

FOREIGN PATENT DOCUMENTS

WO  2021176522 A1  9/2021

OTHER PUBLICATIONS

"International Search Report and Written Opinion Issued in PCT Application No. PCT/US23/010632", dated Apr. 5, 2023, 11 Pages. (MS# 411156-WO-PCT).
Willars, et al., "Enabling Time-Critical Applications over 5G with Rate Adaptation", In White Paper of Ericsson and Deutsche Telekom, May 2021, 21 Pages.

* cited by examiner

*Primary Examiner* — Anez C Ebrahim
(74) *Attorney, Agent, or Firm* — Workman Nydegger

(57) ABSTRACT

A mechanism for adjusting the data rate of data to be transmitted over a data channel based on anticipated changes in the communication channel, rather than based on the current state of the communication channel. This is done by accessing real time environment context data obtained from sensor data generated by one or more sensors of a sensor device, and then predicting a future capacity of a communication channel with a subject head-mounted device based on the accessed real time environment context data. The appropriate data rate is then determined based on this predicted future channel capacity rather than the current channel capacity. The data rate of data that is initiated towards the communication channel is then adjusted based on the determined data rate in anticipation of the predicted future capacity of the communication channel.

20 Claims, 8 Drawing Sheets

RATE ADJUSTMENT ANTICIPATING CHANGE IN CHANNEL CAPACITY

BACKGROUND

From the viewpoint of a user, virtual reality uses devices to replace the physical world with a virtual world. Mixed reality does not entirely replace the physical world from the user's perspective, but instead allows digital objects to co-exist and interact with physical objects in real time. To give the user this perspective, the user typically wears a device on the user's head, so as to provide the user with visual and auditory stimulus to thereby provide the digital objects to the user's senses. Such as device is often termed a "head-mounted device".

The head-mounted device has sensors that permit the device to have context of the real world. Such sensors may include, for example, a variety of cameras. A user who is experiencing mixed reality by wearing the head-mounted device may wander through the real world. As this is happening, the head-mounted device presents digital objects as appropriate to provide the mixed reality experience. Specifically, digital objects are created, removed, or amended as appropriate.

The head-mounted device processes real world context to determine what digital objects to present to the user, as well as where and how to present such digital objects. Such processing can occur locally on the device itself. However, conventional head-mounted devices also communicate digitally with other head-mounted devices or other processing resources. Accordingly, head-mounted devices can have cellular, WIFI™ and BLUETOOTH® communication capability. Furthermore, to allow for a free moving experience, the head-mounted device is powered by a battery.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In order to experience mixed reality, a user wears a head-mounted device and may often wander through the real world. Furthermore, head-mounted devices may communicate with other entities using communication protocols. Such other entities could include opportunistic sources of memory and processing. However, the capacity of a communication channel dynamically changes precisely because of the movement of the user through the real world.

But rate selection of the data is typically done in advance of dispatching the data towards the communication channel, which itself is done in advance of the data being transmitted over the communication channel. This results in the data rate being non-ideally suited when the communication capacity of the channel changes quickly. On the one hand, if the channel capacity is decreasing quickly, the data may accumulate prior to the communication channel since the channel is no longer capable of transmitting at the selected data rate. On the other hand, if the channel capacity is increasing quickly, the channel capacity is underutilized since the channel is capable of transmitting at a much higher data rate than the selected data rate. The principles described herein more optimally use the channel capacity by anticipating future changes in channel capacity.

In one embodiment, the data rate of data to be transmitted over a data channel is based on anticipated changes in the communication channel, rather than based on the current state of the communication channel. This is done by accessing real time environment context data obtained from sensor data generated by one or more sensors of a sensor device, and then predicting a future capacity of a communication channel with a subject head-mounted device based on the accessed real time environment context data. The appropriate data rate is then determined based on this predicted future channel capacity rather than the current channel capacity. The data rate of data that is initiated towards the communication channel is then adjusted based on the determined data rate in anticipation of the predicted future capacity of the communication channel.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In order to experience mixed reality, a user wears a head-mounted device and may often wander through the real world. Furthermore, head-mounted devices may communicate with other entities using communication protocols. Such other entities could include opportunistic sources of memory and processing. However, the capacity of a communication channel dynamically changes precisely because of the movement of the user through the real world.

But rate selection of the data is typically done in advance of dispatching the data towards the communication channel, which itself is done in advance of the data being transmitted over the communication channel. This results in the data rate being non-ideally suited when the communication capacity of the channel changes quickly. On the one hand, if the channel capacity is decreasing quickly, the data may accumulate prior to the communication channel since the channel is no longer capable of transmitting at the selected data rate. On the other hand, if the channel capacity is increasing quickly, the channel capacity is underutilized since the channel is capable of transmitting at a much higher data rate than the selected data rate. The principles described herein more optimally use the channel capacity by anticipating future changes in channel capacity.

In one embodiment, the data rate of data to be transmitted over a data channel is based on anticipated changes in the communication channel, rather than based on the current state of the communication channel. This is done by accessing real time environment context data obtained from sensor data generated by one or more sensors of a sensor device, and then predicting a future capacity of a communication channel with a subject head-mounted device based on the accessed real time environment context data. The appropriate data rate is then determined based on this predicted future channel capacity rather than the current channel capacity. The data rate of data that is initiated towards the communication channel is then adjusted based on the determined data rate in anticipation of the predicted future capacity of the communication channel.

Figure 1:
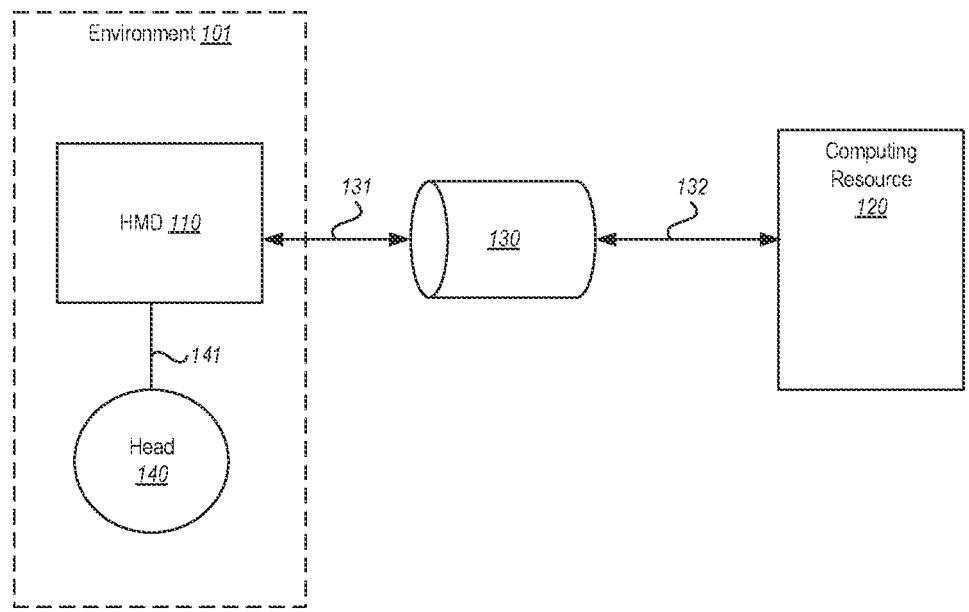
FIG. 1 illustrates a network environment in which the principles described herein may be employed, and that includes a head-mounted device communicating over a communication channel with a computing resource.

FIG. 1 illustrates a network environment 100 that includes a head-mounted device 110 communicating (as represented by bi-directional arrows 131 and 132) over a communication channel 130 with a computing resource 120. The head-mounted device 110 includes a communication component 112 to facilitate such communication. As an example, the head-mounted device 110 may communicate over a cellular, WIFI™, BLUEOOTH® network, or any other networks, or any combination of networks. The computing resource 120 represents an opportunistic source of processing and/or memory for the head-mounted device 110.

The head-mounted device 110 is securely positioned (as represented by line 141) on a head 140 of a user experiencing a mixed reality experience via the head-mounted device 110. As an example only, the head-mounted device 110 may be a helmet, glasses or any other form-factor that illuminates an image into the eye of the user and/or sound into the ear of the user. The head-mounted device 110 may act as a computing system. Accordingly, the head-mounted device may be structured as described below for the computing system 800 of FIG. 8. In this case, the communication component 112 may be structured as described below for the executable component 806 of FIG. 8.

Figure 2:
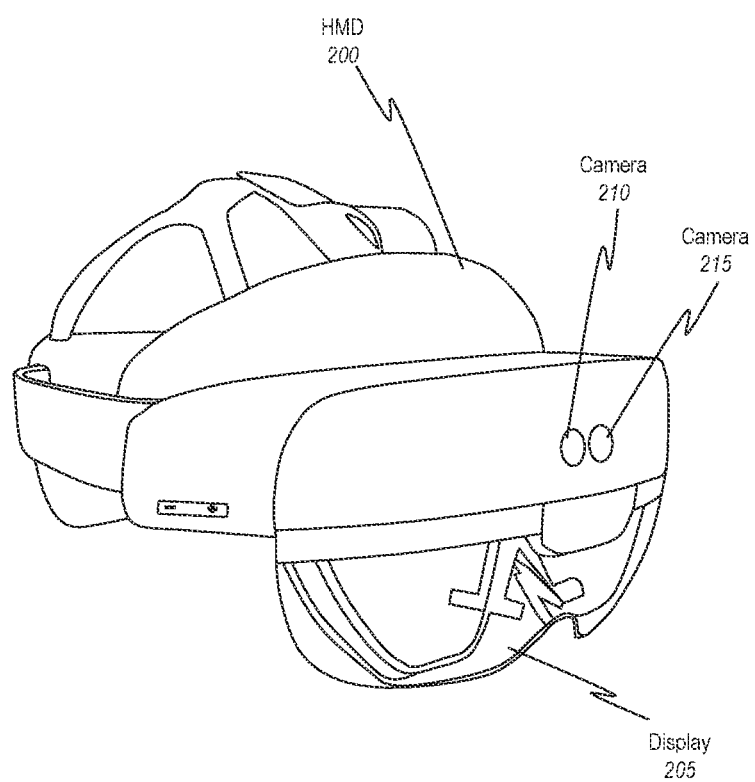
FIG. 2 illustrates a head-mounted device that represents an example of the head-mounted device of FIG. 1.
Figure 3:
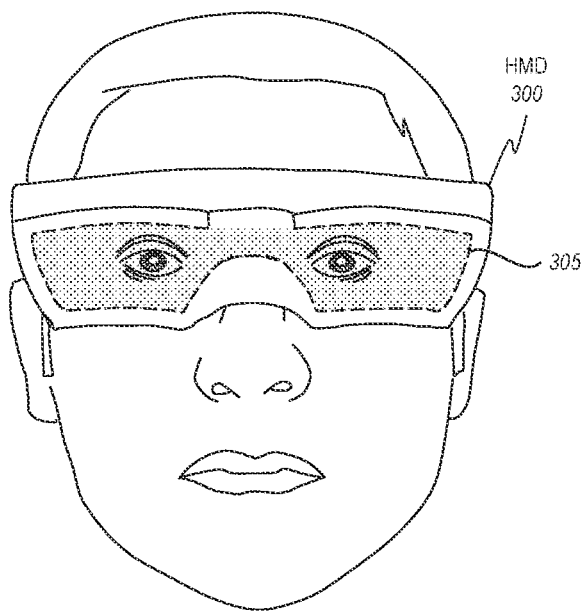
FIG. 3 illustrates another head-mounted device that represents an example of the head-mounted device of FIG. 1.

FIG. 2 illustrates a head-mounted device 200 that represents a mere example of the head-mounted device 110 of FIG. 1. The head-mounted device 200 illuminates images into the eye of the user using the display 205. FIG. 3 illustrates a head-mounted device 300 that represents another example of the head-mounted device 110 of FIG. 1. The head-mounted device 300 illuminates images into the eye of a user using the display 305. The head-mounted devices 200 and 300 are merely a few examples of a countless variety of head-mounted devices that could be used consistent with the principles described herein. The principles described herein are not limited to the form factor of the head-mounted device.

Returning to FIG. 1, the user and the head-mounted device 110 are positioned within a real time environment 101. The head-mounted device 110 includes sensor(s) 111 that sense the real time environment 101. In the example head-mounted device 200 of FIG. 2, the head-mounted device 200 includes cameras 210 and 215 that take in images of the surrounding environment 101. Alternatively, or in addition, there may be a separate sensor device 113 within the environment 101 that also assists in generating environment context for the head-mounted device 110. As an example, the sensor device 113 could be another head-mounted device within the environment 101.

The real time environment 101 of the head-mounted device 110 dynamically changes over time as the user is engaged in a mixed reality experience. In accordance with the principles described herein, the data rate of the communication of the communication channel 130 is adjusted based on a predicted future capacity of the channel 130, and not based on a current capacity of the communication channel 130. Thus, by the time the data reaches the communication channel, the data rate of the data entering the communication channel 130 is more suitably matched with the channel capacity of the communication channel 130. This allows for more data to be communicated over a communication channel that has continually or often changing capacity.

Figure 4:
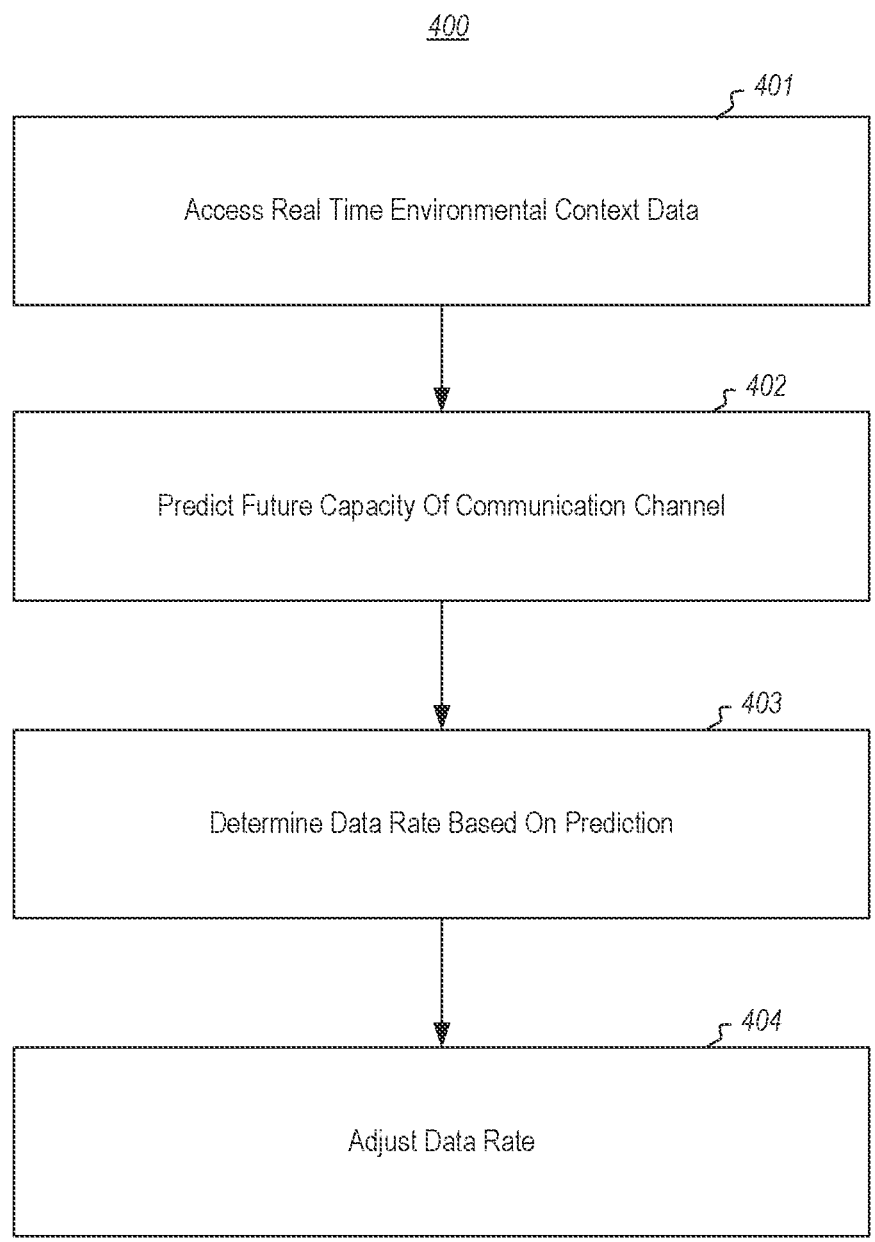
FIG. 4 illustrates a flowchart of a method for adjusting a data rate based on predicted future capacity of a communication channel that communicates with a head-mounted device, in accordance with the principles described herein.
Figure 5:
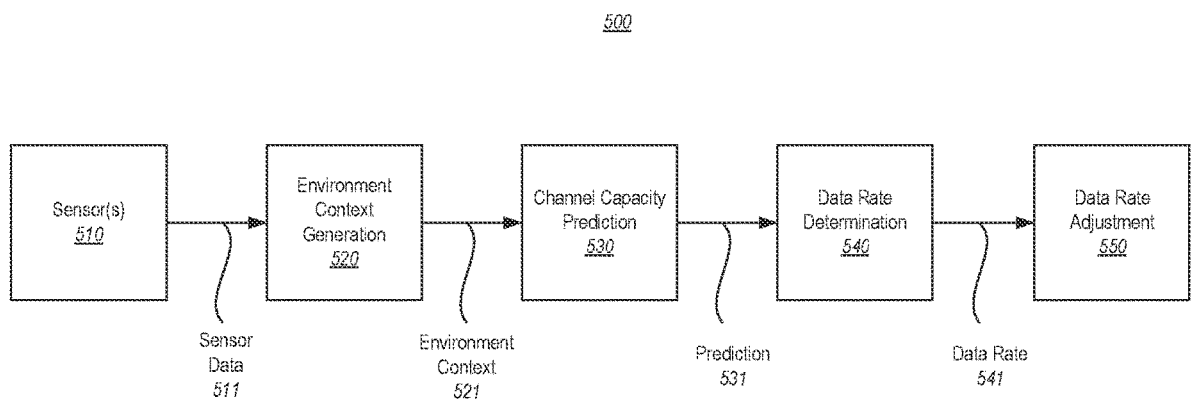
FIG. 5 illustrates a data flow associated with the method of FIG. 4.

Accordingly, FIG. 4 illustrates a flowchart of a method 400 for adjusting a data rate based on predicted future capacity of a communication channel that communicates with a head-mounted device. The prediction is based on sensing of an environment context of the head-mounted device, or based on a prediction of a future environment context of the head-mounted device. FIG. 5 illustrates a data flow 500 associated with the method 400 of FIG. 4. Accordingly, the method 400 of FIG. 4 will be described with frequent reference to the data flow 500 of FIG. 5.

In accordance with the method 400, real time environment context data is accessed that is obtained from sensor data generated by one or more sensors of a sensor device (act 401). Then, the method includes prediction of a future capacity of a communication channel with a subject head-mounted device based on the accessed real time environment context data (act 402). Thereafter, the method 400 includes determining a data rate to use in communicating over the channel based on the predicted future capacity of the communication channel (act 403). Finally, the method 400 includes adjusting the data rate of data initiated towards the communication channel based on the determined data rate in anticipation of the predicted future capacity of the communication channel (act 404).

The method 400 may be repeated to allow for relatively frequent adjustment of the data rate in anticipation of imminent future capacity of the communication channel. This makes for more effective use of the communication channel, and allows faster access to remote computing resources even given dynamically changing environment context of the head-mounted device. Each act of the method 400 will now be described in further detail.

In FIG. 4, the method 400 includes accessing environment context data of the head-mounted device (act 401). This environment context data is obtained from sensor data generated by one or more sensors of a sensor device. As an example, referring to FIG. 5, sensor(s) 510 generate sensor data 511, which is then fed into environment context generation component 520. The environment context generation component 520 then generates the environment context 521 based on the sensor data 511.

Returning to FIG. 4, the method 400 includes predicting a future capacity of a communication channel with a subject head-mounted device based on the accessed real time environment context data (act 402). As an example, referring to FIG. 5, a channel capacity prediction component 530 receives the environment context 521 and makes a channel capacity prediction 531 based on the environment context 521.

Back to FIG. 4, the method 400 includes determining a data rate to use in communicating over the channel based on the predicted future capacity of the communication channel (act 403) Referring to FIG. 5 as an example, the data rate determination component 540 determines a data rate 541 based on the predicted future capacity 531 of the communication channel. The predicted future capacity is of a point in the future at which newly initiated data might be anticipated to enter the communication channel.

Completing FIG. 4, the method 400 includes adjusting the data rate of data initiated towards the communication channel based on the determined data rate (act 404). This is in anticipation of the predicted future capacity of the communication channel. In FIG. 5, the data rate adjustment component 550 adjusts the data rate of data heading towards the communication channel. If the prediction was correct, the communication channel would have the predicted capacity at the time that data entered the communication channel.

If the data flow 500 is implemented by a computing system, such as the computing system 800 described below with respect to FIG. 8, each of the environment context generation component 520, the channel capacity prediction component 530, the data rate determination component 540, and the data rate adjustment component 550 may be structured as described for the executable component 806 of FIG. 8.

Not all of the data flow 500 need be implemented on the same computing system. As an example, the environment context generation component 520 may be performed on the same computing system in which the sensor(s) 510 are located, although that need not be the case. The environment context generation component 520 may be implemented on a different computing system, such as in a cloud computing environment. For instance, referring to FIG. 1, the environment context generation component 520 may be implemented on the computing resource 120. In that case, the sensor data would be transmitted from the sensor device 113 to the computing resource 120. This configuration would permit for more complex processing than might otherwise be available within the sensor device 113. As an example, the environment context generation component 520 may generate the environment context using complex rules, machine-learning networks, or a combination thereof. This would allow for accurate environment context to be obtained.

So the environment context generation component 520 need not be on the same computing system in which the sensor(s) 510 are located. In addition, the channel capacity prediction component 530 may likewise be located either on the same computing system as the sensor(s) 510 are located, or a different computing system than the sensor(s) are located. For instance, the channel capacity prediction component 530 may be implemented in a cloud computing environment, permitting for complex processing and likely more accurate predictions of the future channel capacity. As an example, the channel capacity prediction component 530 may generate the prediction using complex rules, machine-learning networks, or a combination thereof The data rate determination component 540 may likewise be located either on the same computing system as the sensor(s) 510 are located, or a different computing system than the sensor(s) are located. For instance, the data rate determination component 540 may be implemented in a cloud computing environment.

When adjusting the data rate going outward from the head-mounted device 110 to the computing resource 120, the data rate adjustment component 550 may be the communication component 112 on the head-mounted device 110 or a communication layer higher than the communication component 112 also being on the head-mounted device 110. When adjusting the data rate going inward from the computing resource 120 to the head-mounted device 110, the data rate adjustment component 550 may be a communication component on the computing resource 120 that interfaces with the communication channel 130.

As previously mentioned, the method 400 includes an act of accessing real time environment context data obtained from sensor data generated by one or more sensors of a sensor device (act 401). The sensor device could be situated on the head-mounted device itself. As an example, referring to FIG. 1, the sensor data may be generated by the sensor(s) 111 on the head-mounted device 110 itself.

Figure 6:
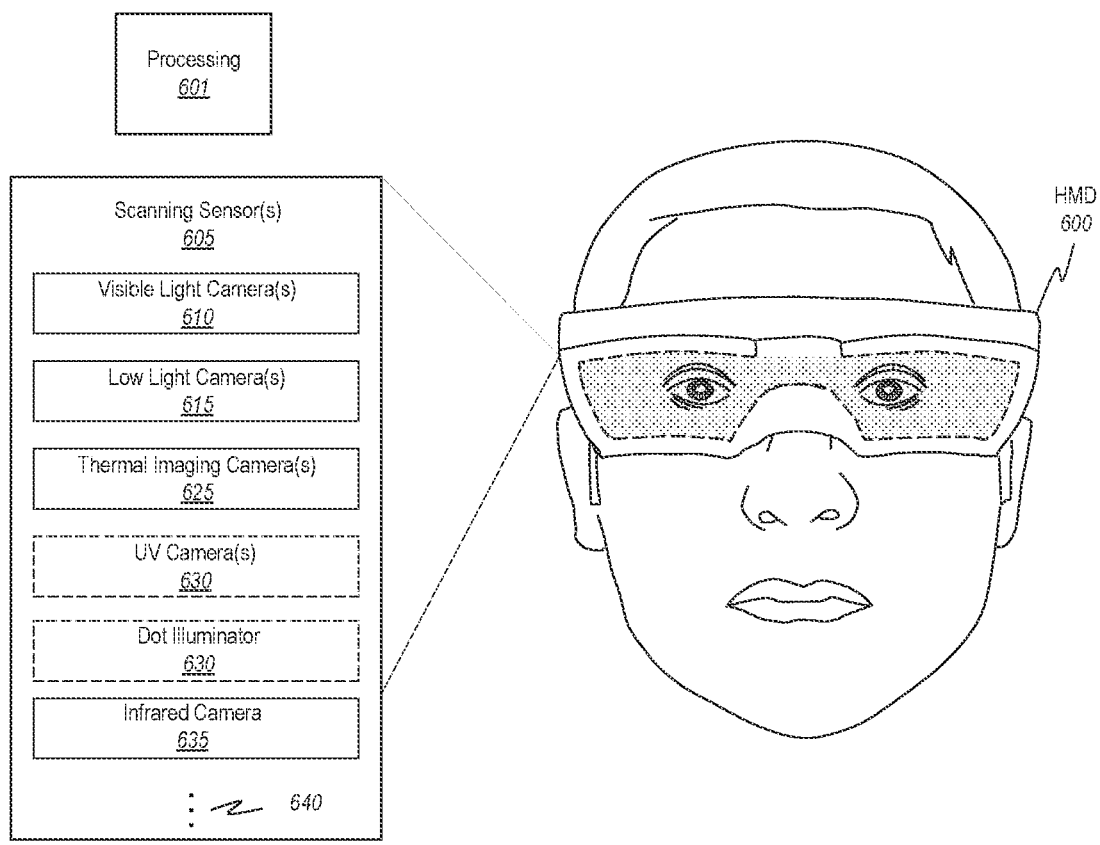
FIG. 6 illustrates a head-mounted device that is similar to the head-mounted device of FIG. 3, except that sensor(s) that are on the head-mounted device are further enumerated.

For example, FIG. 6 illustrates a head-mounted device 600 that is similar to the head-mounted device 300 of FIG. 3, except that sensor(s) 605 that are on the head-mounted device 600 are further enumerated. Such sensor(s) 600 are examples of the sensors 111 of FIG. 1, and include visible light camera(s) 610, low light camera(s) 615, thermal imaging camera(s) 620, ultraviolet camera(s) 625, a dot illuminator(s) 630, infrared camera(s) 635, and so forth. The ellipsis 640 represents that the head-mounted device 600 may include any subset of these cameras and may potentially include other sensors as well. A head-mounted device 600 can thus be very well equipped to sense its environment. The head-mounted device 600 is also illustrated as having some associated on-board processing 601.

The real time environment context data could include, for instance, an absolute position of the head-mounted device, an orientation of the head-mounted device and/or a direction of movement of the head-mounted device. The real time environment context data could also include a predicted future position, orientation, and/or direction of the head-mounted device. The real time environment context data could include a descriptive position, orientation or direction of the head-mounted device. For instance, the environment context data could be that the head-mounted device is currently outside, currently inside, is moving towards an entryway or exit, is proximate a certain number of other head-mounted device, is heading towards other head-mounted devices, and any other information about the environment in which the head-mounted device appears. Each of these pieces of information are relevant to predicting a future capacity of the communication channel 130 between the head-mounted device 110 and the computing resource 120. Accordingly, each of these pieces of information, either individuals or especially collectively, allows for accurate prediction of the future channel capacity of the communication channel.

The principles described herein are not limited to the particular type of real time environment context information that is obtained from the sensor(s). Furthermore, the principles described herein are not limited to the type of sensors that are used to generate sensor data from which the environment context data is obtained. In one example, the sensor data is generated by the sensor(s) on the head-mounted device itself. Alternatively, or in addition, the sensor data may be generated by another sensor device (e.g., sensor device 113) that is not located on the actual head-mounted device for which environment context data is calculated. As an example, another head-mounted device may be used to help determine that a particular head-mounted device is about to head outside.

The principles described herein are also not limited to where the environment context data is actually generated. For instance, the environment context data may be generated by the on-board processing (e.g., on-board processing 601 of the head-mounted device of FIG. 6) that is on a head-mounted device, such as the head-mounted device for which environment context data is being determined. Alternatively, or in addition, the environmental context data may be determined remotely. For example, referring to FIG. 1, sensor data may be provided from a head-mounted device 110 over the actual channel 130 to have processing on the computing resource 120 generate the actual environment context data. Accordingly, the generation of sensor data and the obtaining of environment context data may be distinctly performed, and may even be performed by different network nodes.

Figure 7:
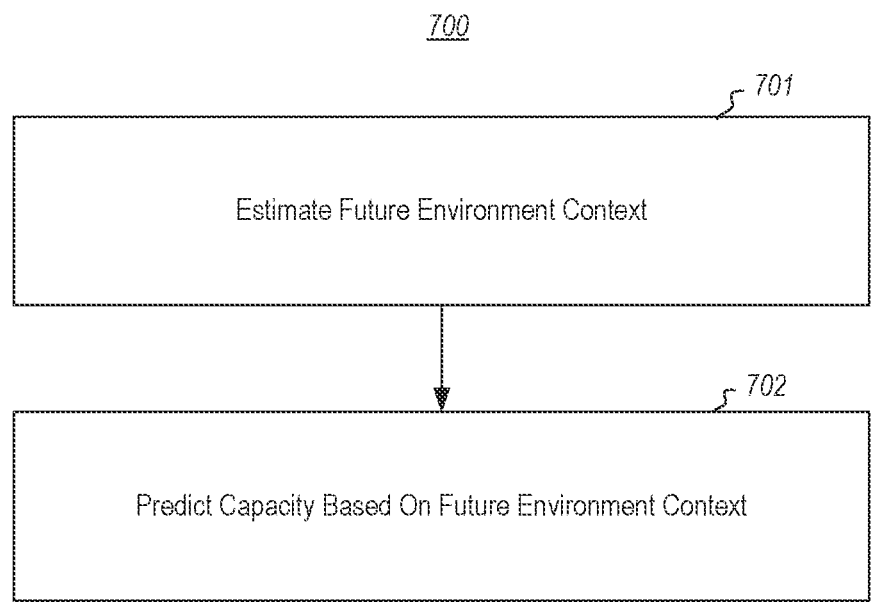
FIG. 7 illustrates a flowchart of a method for predicting a future capacity of a communication channel, and represents an example of second act of FIG. 4.

FIG. 7 illustrates a flowchart of a method 700 for predicting a future capacity of a communication channel, and represents an example of the act 402 of FIG. 4. The method 700 includes estimating a future environment context (e.g., position, movement, orientation, etc.) of the head-mounted device based on the current environment context data (act 701). The method 700 then includes predicting the future capacity based on the estimated future environment context of the head-mounted device. Thus, the principles described herein allow for refined prediction of future communication channel capacity leveraging what the sensors indicate may be the intent of the wearer of the head-mounted device.

Thus, the determined data rate to transmit over the communication channel may even be higher than a current capacity of the communication channel if the predicted future channel capacity is substantially higher than the current channel capacity. Thus, if the environment context is that the user is about to go outside (where channel capacity would substantially increase over a cellular network), the system may decide now to begin transmitting at higher data rates. On the other hand, if the environment context is that the user is about to go indoors, the system may decide now to lower the data rate. Thus, by the time the data actually enters the communication channel, the data rate is more likely to be properly matched to the capability of the communication channel. This makes more optimal use of the communication channel when the channel capacity changes often.

Because the principles described herein are performed in the context of a computing system, some introductory discussion of a computing system will be described with respect to FIG. 8. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
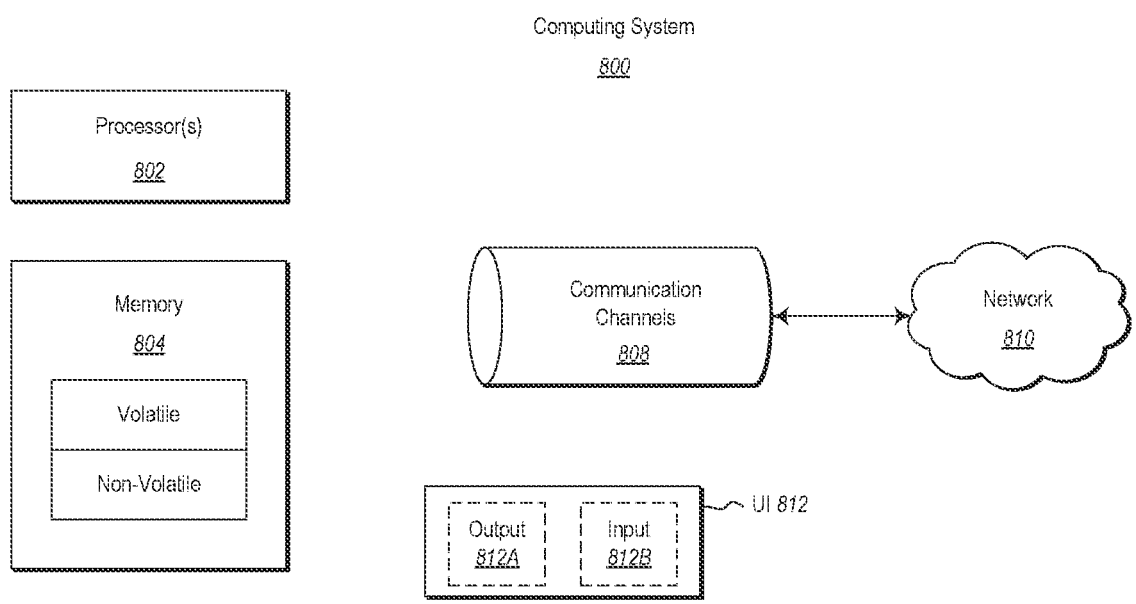
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
   one or more processors; and
   one or more computer-readable media having thereon computer-executable instructions that are structured such that, if executed by the one or more processors, the computing system would be configured to adjust a data rate transmitted over a communication channel in anticipation of changing capacity of the communication channel, by being configured to repeatedly perform the following:
      access real time environment context data obtained from sensor data generated by one or more sensors of a sensor device;
      predict a future capacity of the communication channel based on the accessed real time environment context data, wherein the communication channel is between a subject head-mounted device and a computing resource;
      determine a data rate to use in communicating over the communication channel based on the predicted future capacity of the communication channel; and
      adjust the data rate of data initiated towards the communication channel based on the determined data rate in anticipation of the predicted future capacity of the communication channel.

2. The computing system in accordance with claim 1, the computer-executable instructions further configured such that the determined data rate is higher than a current capacity of the communication channel in at least some instance when the predicted future capacity is greater than a current capacity of the communication channel.

3. The computing system in accordance with claim 1, the computer-executable instructions being further structured such that, if executed by the one or more processors, the prediction of a future capacity of the communication channel with the subject head-mounted device would comprise the following:
   estimating a future position of the subject head-mounted device based on the environment context data; and
   determining the future capacity of the communication channel based on the estimated future position of the subject head-mounted device.

4. The computing system in accordance with claim 1, the computer-executable instructions being further structured such that, if executed by the one or more processors, the accessing real time environment context data obtained from sensor data generated by one or more sensors of a sensor device would comprise the following:
   generating the real time environment context data from sensor data generated by the sensor device.

5. The computing system in accordance with claim 1, the environment context data being an absolute position of the subject head-mounted device.

6. The computing system in accordance with claim 1, the environment context data being a descriptive position of the head-mounted device.

7. The computing system in accordance with claim 1, the computing system comprising the subject head-mounted device.

8. The computing system in accordance with claim 1, the subject head-mounted device comprising the sensor device.

9. The computing system in accordance with claim 1, the sensor device being another head-mounted device.

10. A method for adjusting a data rate transmitted over a communication channel in anticipation of changing capacity of the communication channel, the method comprising the following:
    accessing real time environment context data obtained from sensor data generated by one or more sensors of a sensor device;
    predicting a future capacity of the communication channel with a subject head-mounted device based on the accessed real time environment context data, wherein the subject head-mounted device illuminates an image into an eye of a user, the image based on data transmitted over the communication channel;
    determining the data rate to use in communicating over the communication channel based on the predicted future capacity of the communication channel; and
    adjusting the data rate of data initiated towards the communication channel based on the determined data rate in anticipation of the predicted future capacity of the communication channel.

11. The method in accordance with claim 10, where at least some times when the predicted future capacity is greater than a current capacity of the communication channel in which the determined data rate is higher than a current capacity of the communication channel.

12. The method in accordance with claim 10, the prediction of a future capacity of a communication channel comprising the following:
    estimating a future position of the subject head-mounted device based on the environment context data; and
    determining the future capacity of the communication channel based on the estimated future position of the subject head-mounted device.

13. The method in accordance with claim 10, the accessing real time environment context data obtained from sensor data generated by one or more sensors of a sensor device comprising the following:
    generating the real time environment context data from sensor data generated by the sensor device.

14. The method in accordance with claim 10, the environment context data being an absolute position of the subject head-mounted device.

15. The method in accordance with claim 10, the environment context data being a descriptive position of the head-mounted device.

16. The method in accordance with claim 10, wherein the method is performed by the subject head-mounted device.

17. The method in accordance with claim 10, the subject head-mounted device comprising the sensor device.

18. The method in accordance with claim 10, the sensor device being another head-mounted device.

19. A hardware storage device comprising stored computer-executable instructions that are structured such that, if executed by one or more processors of a computing system, would cause the computing system to be configured to adjust a data rate transmitted over a communication channel in anticipation of changing capacity of the communication channel, by being configured to repeatedly perform the following:
- access real time environment context data obtained from sensor data generated by one or more sensors of a sensor device;
- predict a future capacity of the communication channel based on the accessed real time environment context data, wherein the communication channel is between a subject head-mounted device and a computing resource;
- determine a data rate to use in communicating over the communication channel based on the predicted future capacity of the communication channel; and
- adjust the data rate of data initiated towards the communication channel based on the determined data rate in anticipation of the predicted future capacity of the communication channel.

20. The computer program product in accordance with claim 19, the computer-executable instructions further configured such that the determined data rate is higher than a current capacity of the communication channel in at least some instance when the predicted future capacity is greater than a current capacity of the communication channel.

* * * * *